(12) United States Patent
Hara (10) Patent No.: US 11,661,108 B2
(45) Date of Patent: May 30, 2023

(54) DRIVING ASSISTANCE DEVICE AND METHOD

(71) Applicant: TOYOTA JIDOSHA KABUSHIKI KAISHA, Toyota (JP)

(72) Inventor: Kenichiroh Hara, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 355 days.

(21) Appl. No.: 16/984,461

(22) Filed: Aug. 4, 2020

(65) Prior Publication Data

US 2021/0039713 A1 Feb. 11, 2021

(30) Foreign Application Priority Data

Aug. 7, 2019 (JP) .............................. JP2019-145694

(51) Int. Cl.
- *B62D 15/02* (2006.01)
- *B62D 1/04* (2006.01)
- *G05D 1/00* (2006.01)
- *B60W 40/08* (2012.01)
- *B60W 50/08* (2020.01)

(52) U.S. Cl.
CPC ........... *B62D 15/025* (2013.01); *B60W 40/08* (2013.01); *B60W 50/08* (2013.01); *B62D 1/04* (2013.01); *G05D 1/0088* (2013.01); *B60W 2540/223* (2020.02); *G05D 2201/0213* (2013.01)

(58) Field of Classification Search
CPC combination set(s) only.
See application file for complete search history.

(56) References Cited

U.S. PATENT DOCUMENTS

| | | | |
|---|---|---|---|
| 2017/0129499 A1 | 5/2017 | Odate | |
| 2017/0248952 A1* | 8/2017 | Perkins | ............... B60W 50/082 |
| 2018/0326992 A1 | 11/2018 | Aoi et al. | |
| 2019/0047588 A1 | 2/2019 | Yabuuchi et al. | |
| 2019/0073546 A1 | 3/2019 | Aoi et al. | |
| 2020/0148226 A1* | 5/2020 | Kim | .................. B60W 50/0097 |

FOREIGN PATENT DOCUMENTS

| | | |
|---|---|---|
| CN | 109383525 A | 2/2019 |
| CN | 109421733 A | 3/2019 |
| JP | 2013-244914 A | 12/2013 |
| JP | 2016168972 A | 9/2016 |
| JP | 2017087883 A | 5/2017 |
| JP | 2017132384 A | 8/2017 |
| JP | 2018-111392 A | 7/2018 |
| JP | 2018190217 A | 11/2018 |
| JP | 2019-168814 A | 10/2019 |

* cited by examiner

*Primary Examiner* — Peter D Nolan
*Assistant Examiner* — Jacob Besteman-Street
(74) *Attorney, Agent, or Firm* — Dickinson Wright, PLLC (57) ABSTRACT

The driving assistance device includes a movement detecting unit detecting an attitude changing movement for changing the attitude of a driver seat or a steering wheel of a vehicle capable of traveling in an automated driving mode in which a driver need not perform driving operations during traveling, a hold detecting unit detecting whether or not the steering wheel is held by the driver, and a hold requesting unit starting a holding request asking the driver to hold the steering wheel if the movement detecting unit has detected the attitude changing movement in the automated driving mode and if the hold detecting unit has not detected hold of the steering wheel.

9 Claims, 5 Drawing Sheets

DRIVING ASSISTANCE DEVICE AND METHOD

CROSS-REFERENCE TO RELATED APPLICATION

This application claims priority to Japanese Patent Application No. 2019-145694 filed on Aug. 7, 2019, and is incorporated herein by reference in its entirety.

FIELD

The present invention relates to a driving assistance device and method.

BACKGROUND

A technique is known in which images indicating the circumstances around a vehicle are captured by a camera included in the vehicle and are used by a travel control device to control traveling of the vehicle. Once control of a vehicle by such a travel control device (hereinafter, also referred to as "automated driving") is started, the driver need not drive by alone (or perform "manual driving"), and thus may take his/her hands off the steering wheel.

Japanese Unexamined Patent Publication No. 2017-087883 (referred to as Patent Literature 1) describes a contact determination processing apparatus which determines whether an occupant of a vehicle is touching its steering wheel, based on whether or not an output of a contact sensor provided for the steering wheel is not less than a predetermined threshold, wherein the threshold is changed depending on an ambient temperature around the steering wheel.

SUMMARY

According to the technique described in Patent Literature 1, the travel control device determines whether to switch from the automated driving to the manual driving, based on whether or not the driver is holding the steering wheel. If it is determined that the driver is not holding the steering wheel, the travel control device cannot make this switch until it requests the driver to hold the steering wheel and makes sure that it is held. Accordingly, when it is desirable to switch from the automated driving to the manual driving in a short time due to, for example, a sudden change of surrounding circumstances, it may be difficult to quickly switch to the manual driving.

It is an object of the present invention to provide a driving assistance device appropriately making a request to hold the steering wheel according to the circumstances of the driver.

The driving assistance device includes a movement detecting unit detecting an attitude changing movement for changing the attitude of a driver seat or a steering wheel of a vehicle capable of traveling in an automated driving mode in which a driver need not perform driving operations during traveling, a hold detecting unit detecting whether or not the steering wheel is held by the driver, and a hold requesting unit starting a holding request asking the driver to hold the steering wheel if the movement detecting unit has detected the attitude changing movement in the automated driving mode and if the hold detecting unit has not detected hold of the steering wheel.

The movement detecting unit of the driving assistance device preferably detects the attitude changing movement if the amount of movement of the driver seat or the amount of movement of the steering wheel is greater than a movement amount threshold.

The hold requesting unit of the driving assistance device preferably starts the holding request if the movement detecting unit has detected the end of the attitude changing movement.

The hold requesting unit of the driving assistance device preferably stops starting the holding request if it is determined that the driver is in a posture ready to hold the steering wheel, based on an image of the driver captured by a driver monitoring camera.

The movement detecting unit of the driving assistance device preferably detects the end of the attitude changing movement if no attitude changing movement occurs for a longer time than a moving time threshold after the start of the attitude changing movement is detected.

The hold requesting unit of the driving assistance device preferably terminates the holding request if the hold detecting unit continues detecting that the steering wheel is held for a longer time than a hold time threshold after the holding request is started.

The hold requesting unit of the driving assistance device preferably requests termination of the automated driving mode if the hold detecting unit continues detecting that the steering wheel is not held for a longer time than an end time threshold after the holding request is started, the end time threshold being greater than the hold time threshold.

The driving assistance device preferably further includes an attitude changing unit moving the driver seat or the steering wheel so as to have an attitude prior to detection of the attitude changing movement if detection of hold of the steering wheel continues for a longer time than the hold time threshold.

The method of driving assistance includes the step of starting requesting a driver to hold a steering wheel of a vehicle if an attitude changing movement for changing the attitude of a driver seat or the steering wheel of the vehicle is detected, the vehicle traveling in an automated driving mode in which the driver need not perform driving operations.

The driving assistance device can appropriately make a request to hold the steering wheel according to the circumstances of the driver.

BRIEF DESCRIPTION OF DRAWINGS

Other features and advantages of the present invention will be apparent from the ensuing description, taken in conjunction with the accompanying drawings, in which.

DESCRIPTION OF EMBODIMENTS

Hereinafter, with reference to the accompanying drawings, a driving assistance device and method will be explained in detail. However, note that the present invention is not limited to the drawings or the embodiments described below.

In a vehicle traveling in an automated driving mode, the driving assistance device starts a holding request asking the driver of the vehicle to hold the steering wheel if it has detected an attitude changing movement for changing the attitude of the driver seat or the steering wheel of the vehicle. Thereby, the driving assistance device can appropriately make a request to hold the steering wheel according to the circumstances of the driver.

Hereinafter, an embodiment in which the driving assistance device is included in a vehicle will be explained. The driving assistance device requests the driver of the vehicle to hold the steering wheel according to the circumstances of the driver.

Figure 1:
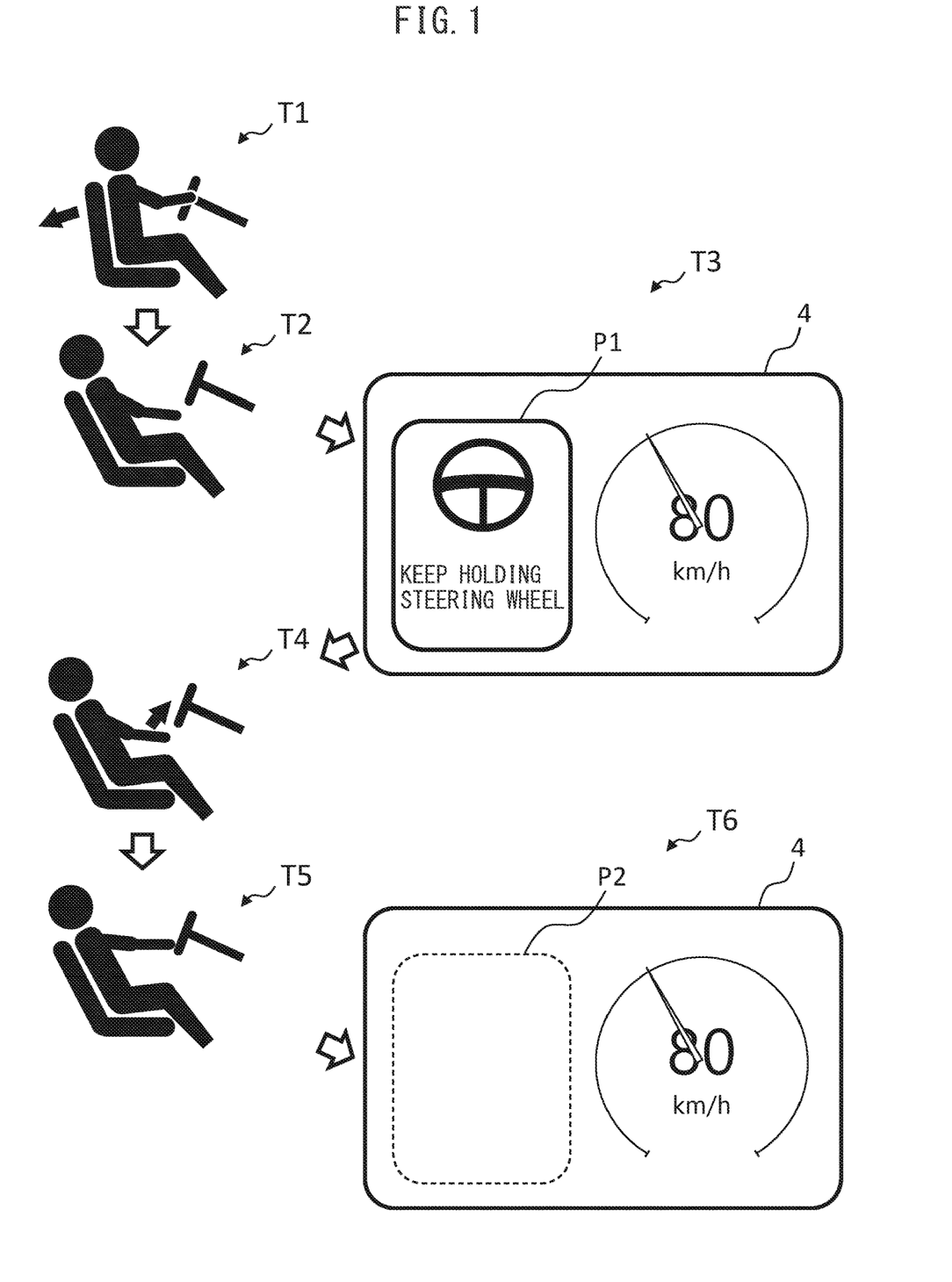
FIG. 1 is a diagram for briefly explaining the operation of the driving assistance device.
Figure 2:
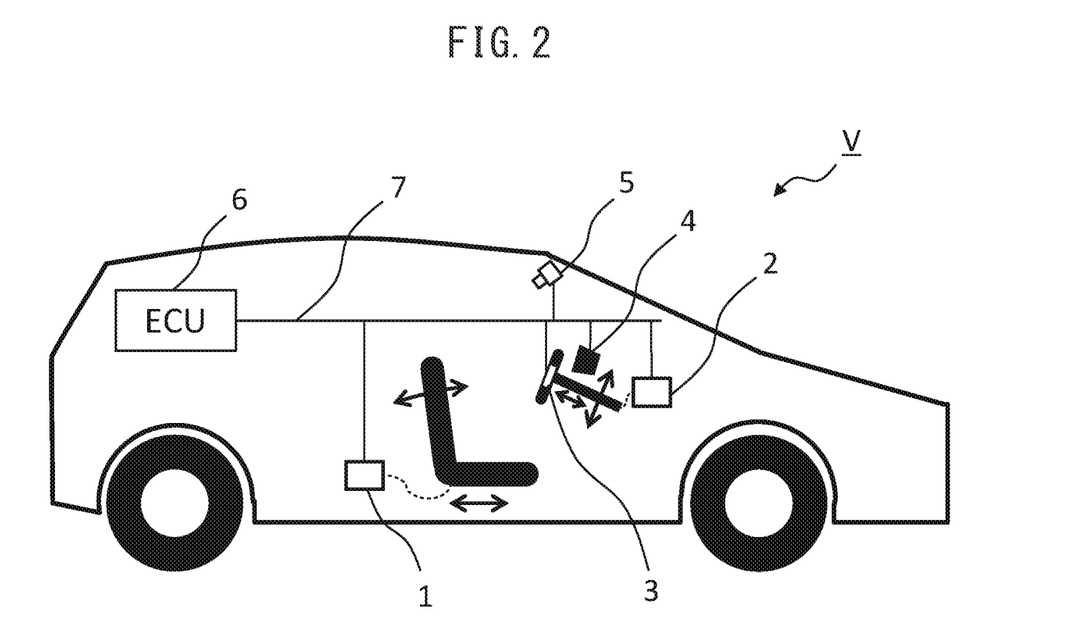
FIG. 2 is a diagram schematically illustrating a vehicle equipped with the driving assistance device.

FIG. 1 is a diagram for briefly explaining the operation of the driving assistance device. FIG. 2 is a diagram schematically illustrating a vehicle equipped with the driving assistance device.

The vehicle V includes a seat controller 1 controlling an attitude changing movement of the driver seat, a steering controller 2 controlling an attitude changing movement of the steering wheel, and a steering holding sensor 3 detecting whether or not the steering wheel is held by the driver. The vehicle V also includes a meter cluster 4 visually showing the state of the traveling vehicle, a driver monitoring camera 5 taking pictures of the driver, and an electronic control unit (ECU) 6.

The seat controller 1 includes a seat attitude sensor outputting a movement signal depending on an attitude changing movement of the driver seat based on operations of the driver, and a seat attitude actuator changing the attitude of the driver seat in accordance with a received control signal. The attitude changing movement of the driver seat includes, for example, a change of the angle of the backrest (reclining) and a back-and-forth movement of the seat.

The steering controller 2 includes a steering attitude sensor outputting a movement signal depending on an attitude changing movement of the steering wheel based on operations of the driver, and a steering attitude actuator changing the attitude of the steering wheel in accordance with a received control signal. The attitude changing movement of the steering wheel includes, for example, a change of its angle by up-and-down movements and a change of its position in the back-and-forth direction.

The steering holding sensor 3 outputs a steering holding signal depending on whether or not the driver is holding the steering wheel. The steering holding sensor 3 is, for example, a capacitive sensor provided in the steering wheel, and outputs a signal depending on the capacitance, which is different between when the steering wheel is held by the driver and when not held.

The meter cluster 4 is a set of meters (e.g., a speedometer and a fuel gauge) notifying the state of the vehicle to the driver. The meter cluster 4 includes an indicator (e.g., a warning light) other than the meters. The meter cluster 4 may be a head-up display (HUD) projecting various images on the windshield.

The driver monitoring camera 5 is a camera taking pictures of the driver and outputs images thereof. The driver monitoring camera 5 is disposed in a front and upper area inside the vehicle, and is directed toward the face of the driver sitting on the driver seat.

The ECU 6 is an example of the driving assistance device. The configuration of the ECU 6 will be described later.

The seat controller 1, the steering controller 2, the steering holding sensor 3, the meter cluster 4, the driver monitoring camera 5 and the ECU 6 are connected through an in-vehicle network 7 so as to be in communication with one another. The ECU 6 may function as a travel control device for automated driving of the vehicle V, based on images captured by a surrounding camera (not shown) for capturing images around the vehicle. Alternatively, another travel control device may be provided which is connected through the in-vehicle network 7.

In FIG. 1, T1 indicates that a driver of a vehicle traveling in an automated driving mode starts an attitude changing movement of the driver seat. This movement in which the driver lowers the backrest of the driver seat results in the state indicated by T2.

If the ECU6 has detected an attitude changing movement of the driver seat, the ECU 6 causes the meter cluster 4 to display an image P1 indicating a holding request asking the driver to hold the steering wheel. T3 indicates the image displayed at this time in the meter cluster 4. In the example of FIG. 1, the image P1 is a combination of an icon indicating the holding request and a character string "Keep holding steering wheel" for making a request to continue holding the steering wheel. In the example of FIG. 1, the image P1 is shown on the left of a speed indicator.

Following the instructions of the displayed image P1, the driver holds the steering wheel (T4 to T5). The ECU 6 terminates the display of the holding request image P1 if it continues detecting that the steering wheel is held for a longer time than a hold time threshold after the holding request is started. The ECU 6 causes the meter cluster 4 to display an image P2 including neither an icon indicating a steering wheel nor a character string of a sentence for making a request to continue holding the steering wheel, instead of the image P1. T6 indicates the image displayed at this time in the meter cluster 4.

Figure 3:
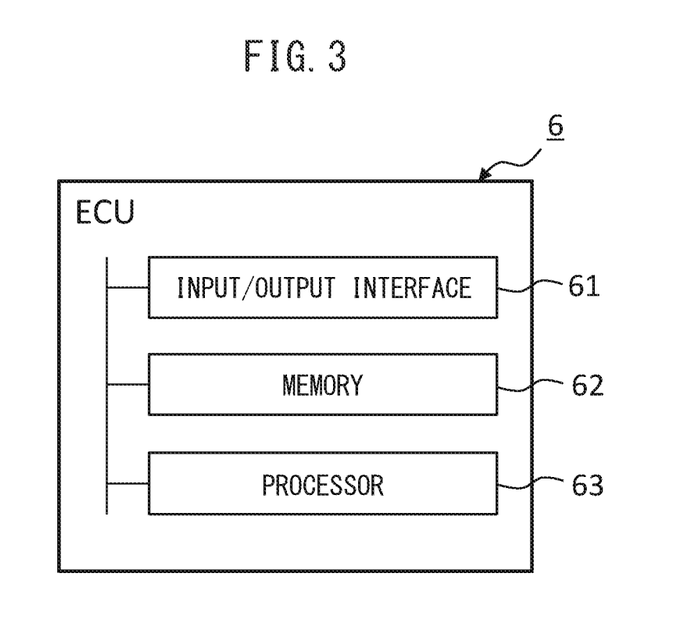
FIG. 3 is a schematic diagram of the hardware of the ECU.

FIG. 3 is a schematic diagram of the hardware of the ECU 6.

The ECU 6 detects the start and end of an attitude changing movement of the driver seat or the steering wheel of the vehicle. The ECU 6 also detects whether or not the steering wheel is held by the driver. If it has detected an attitude changing movement in the automated driving mode, the ECU 6 starts requesting the driver to hold the steering wheel. To this end, the ECU 6 includes an input/output interface 61, a memory 62 and a processor 63.

The input/output interface 61 is an example of a communication unit, and includes an interface circuit for inputting and outputting data between the ECU 6 and an external device. The input/output interface 61 provides received data for the processor 63, and outputs data provided from the processor 63 to an external device. The input/output interface 61 is, for example, a circuit for communicating in conformity with the controller area network (CAN).

The memory 62 is an example of a storage unit, and includes volatile and nonvolatile semiconductor memories. The memory 62 stores various kinds of data used for processing by the processor 63, such as images displayed in the meter cluster 4 for requesting to hold the steering wheel and various thresholds used for driving assistance processing.

The processor 63 is an example of a control unit, and includes one or more processors and peripheral circuits thereof. The processor 63 may further include other arithmetic circuits, such as a logical operation unit, a numerical operation unit and a graphical processing unit. The processor 63 repeatedly executes driving assistance processing while the vehicle V travels in the automated driving mode.

Figure 4:
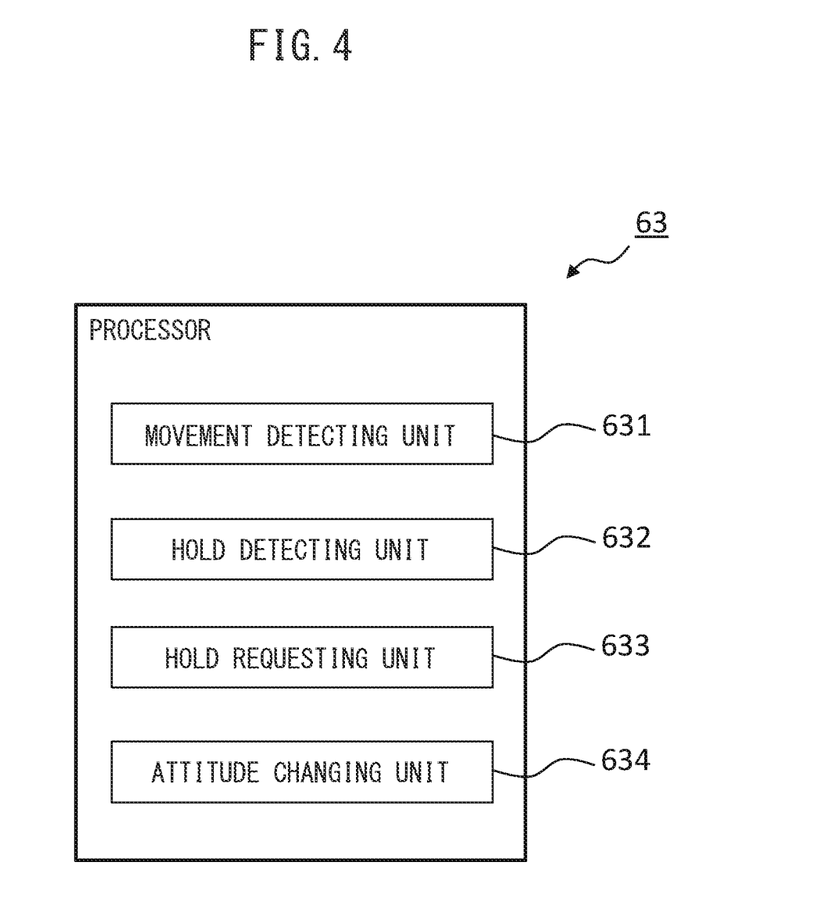
FIG. 4 is a functional block diagram of the processor included in the ECU.

FIG. 4 is a functional block diagram of the processor 63 included in the ECU 6.

As its functional blocks, the processor 63 of the ECU 6 includes a movement detecting unit 631, a hold detecting unit 632, a hold requesting unit 633 and an attitude changing unit 634. These units included in the processor 63 are functional modules implemented by a program executed on the processor 63, or may be implemented on the ECU 6 as an independent integrated circuit, a microprocessor or a firmware.

The movement detecting unit 631 receives the movement signal outputted by the seat controller 1 or the steering controller 2 connected to the in-vehicle network 7, through the input/output interface 61. The movement detecting unit 631 detects the start and end of an attitude changing movement of the driver seat or the steering wheel of the vehicle V, based on the received movement signal. If the movement detecting unit 631 has detected an attitude changing movement of the driver seat or the steering wheel, the movement detecting unit 631 stores the previous attitude, i.e., the attitude prior to the detection of the attitude changing movement, in the memory 62.

The movement detecting unit 631 detects the start of an attitude changing movement if the amount of movement of the driver seat or that of the steering wheel is greater than a movement amount threshold stored in the memory 62. The movement amount threshold is stored for each of the amount of movement of the driver seat and that of the steering wheel.

The movement detecting unit 631 detects the end of the attitude changing movement if no attitude changing movement occurs for a longer time than a moving time threshold stored in the memory 62, after the start of the attitude changing movement is detected. The moving time threshold is stored for each of the moving time of the driver seat and that of the steering wheel. Alternatively, only one moving time threshold may be stored which is compared with both the moving time of the driver seat and that of the steering wheel.

The hold detecting unit 632 receives the steering holding signal outputted by the steering holding sensor 3 connected to the in-vehicle network 7, through the input/output interface 61. The hold detecting unit 632 detects whether or not the steering wheel is held by the driver, based on the steering holding signal.

The hold requesting unit 633 determines whether or not the movement detecting unit 631 has detected an attitude changing movement in the automated driving mode. If the movement detecting unit 631 has detected an attitude changing movement in the automated driving mode, the hold requesting unit 633 starts requesting the driver of the vehicle V to hold the steering wheel. More specifically, the hold requesting unit 633 sends a command to display the holding request image P1 stored in the memory 62 through the input/output interface 61 to the meter cluster 4 connected to the in-vehicle network 7. The holding request image may be an icon indicating the holding request. The hold requesting unit 633 may send a command to play back a voice indicating the holding request to an in-vehicle speaker (not shown) connected to the in-vehicle network 7, instead of displaying the image P1, or in addition thereto. The voice played back in addition to displaying the image P1 may be a warning beep for calling attention to the displayed image P1.

The hold requesting unit 633 may start the holding request if the movement detecting unit 631 has detected the end of the attitude changing movement. This enables the ECU 6 to avoid diverting attention of the driver who performs operations for the attitude changing movement, allowing for improving safety.

The hold requesting unit 633 may not start requesting the driver to hold the steering wheel if the hold detecting unit 632 has detected that the steering wheel is held by the driver. This allows for avoiding requesting a driver who is already holding the steering wheel to do so.

The hold requesting unit 633 receives images captured by the driver monitoring camera 5 connected to the in-vehicle network 7, through the input/output interface 61. The hold requesting unit 633 stops starting the holding request if it has determined that the driver is in a posture ready to hold the steering wheel, based on the received images.

Figure 5A:
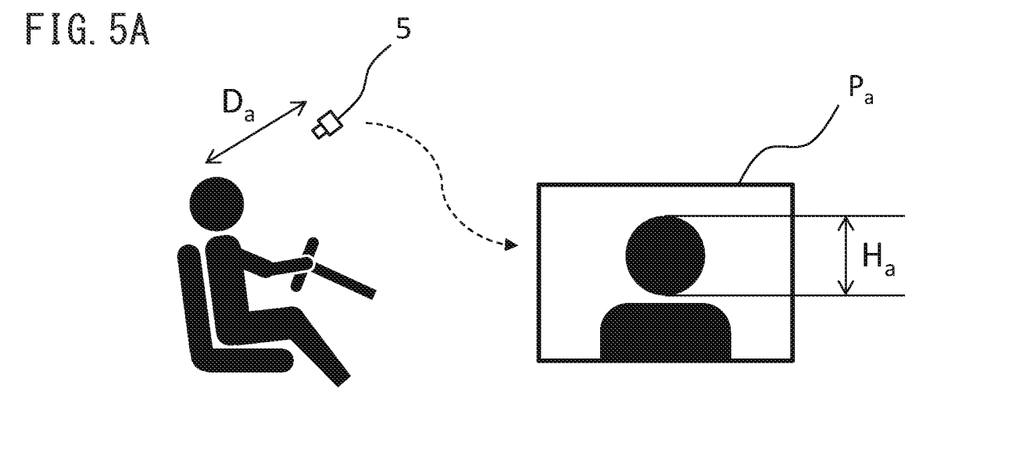
FIGS. 5A-5C are diagrams for explaining images captured by the driver monitoring camera before an attitude changing movement, after a change to a first attitude, and after a change to a second attitude, respectively.
Figure 5B:
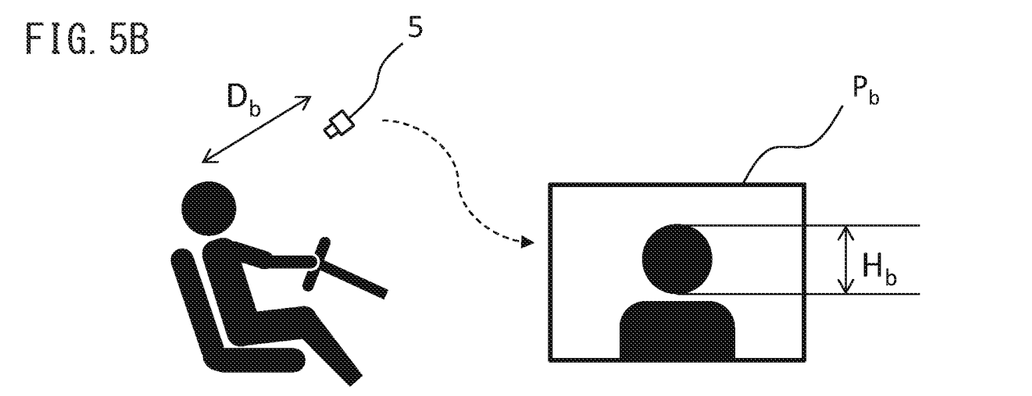
Figure 5C:
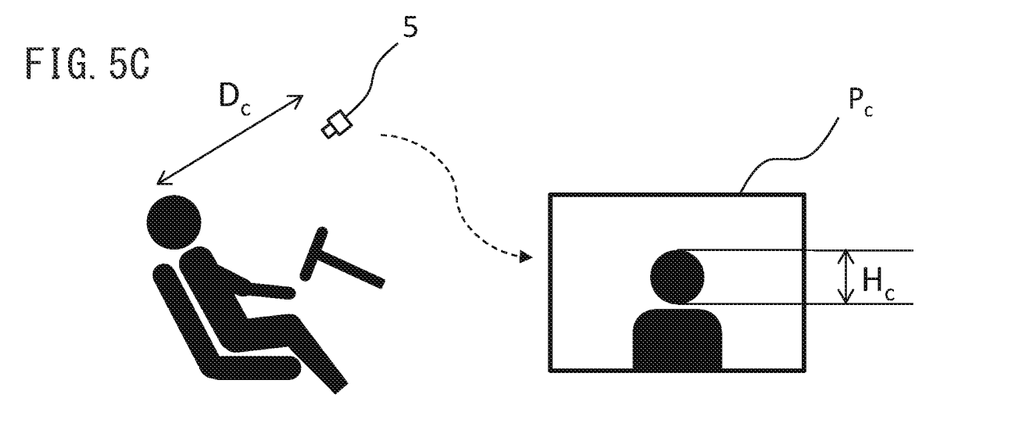

FIGS. 5A-5C are diagrams for explaining images captured by the driver monitoring camera 5. FIGS. 5A-5C show an image $P_a$ captured before an attitude changing movement, an image $P_b$ captured after a change to a first attitude, and an image $P_c$ captured after a change to a second attitude, respectively.

The hold requesting unit 633 inputs an image captured by the driver monitoring camera 5 to a classifier which has been trained to detect a face region in an image, and thereby specifies a face region in the inputted image.

As shown in FIG. 5A, in the image $P_a$ captured by the driver monitoring camera 5 before an attitude changing movement, the specified face region has a height of $H_a$.

FIG. 5B shows the state where the backrest of the driver seat is moved by the driver so as to have a first attitude. In the image $P_b$ captured by the driver monitoring camera 5, the specified face region has a height of $H_b$, which is smaller than $H_a$. Let $D_a$ denote the distance from the driver monitoring camera 5 to the face of the driver prior to the attitude changing movement; then, the distance $D_b$ from the driver monitoring camera 5 to the face of the driver in the first attitude can be expressed as $(H_a/H_b) \times D_a$.

FIG. 5C shows the state where the backrest of the driver seat is moved by the driver so as to have a second attitude. In the image $P_c$ captured by the driver monitoring camera 5, the specified face region has a height of $H_c$, which is smaller than $H_b$. The distance $D_c$ from the driver monitoring camera 5 to the face of the driver in the second attitude can be expressed as $(H_a/H_c) \times D_a$.

Thus, the inverse ratio of the heights of the face regions before and after an attitude changing movement is proportional to the distance from the driver monitoring camera 5 to the face of the driver before and after the attitude changing movement. Consequently, the hold requesting unit 633 can determine whether or not the driver is in a posture ready to hold the steering wheel, by comparing the inverse ratio of the heights of the face regions before and after an attitude changing movement ($H_a/H_b$ in the example of FIG. 5B) with a predetermined threshold. The posture ready to hold the steering wheel refers to a posture in which the face of the driver is away from the position thereof prior to the attitude changing movement within a predetermined range.

For example, if the inverse ratio $H_a/H_b$ of the heights of the face regions before and after the attitude changing movement is smaller than a predetermined threshold, the hold requesting unit 633 determines that the driver is in a posture ready to hold the steering wheel in the image $P_b$ captured in the first attitude. At this time, the hold requesting unit 633 stops starting requesting the driver to hold the steering wheel (i.e., does not start the holding request).

On the other hand, if this inverse ratio $H_a/H_b$ is larger than the predetermined threshold, the hold requesting unit 633 determines that the driver is not in a posture ready to hold the steering wheel in the image $P_b$ captured in the first attitude. At this time, the hold requesting unit 633 does not stop starting requesting the driver to hold the steering wheel (i.e., starts the holding request).

The hold requesting unit 633 determines whether or not the hold detecting unit 632 continues detecting that the steering wheel is held for a longer time than the hold time threshold stored in the memory 62, after the holding request is started. If the hold detecting unit 632 continues detecting that the steering wheel is held for a longer time than the hold time threshold, the hold requesting unit 633 terminates the holding request. More specifically, the hold requesting unit 633 sends a command to stop displaying the holding request image P1 stored in the memory 62 through the input/output interface 61 to the meter cluster 4 connected to the in-vehicle network 7. If a voice indicating the holding request is played back by an in-vehicle speaker (not shown), the hold requesting unit 633 also sends a command to stop the playback of this voice to the in-vehicle speaker.

The hold requesting unit 633 also determines whether or not the hold detecting unit 632 continues detecting that the steering wheel is not held for a longer time than the end time threshold stored in the memory 62, after the holding request is started. The end time threshold is greater than the hold time threshold. If the hold detecting unit 632 continues detecting that the steering wheel is not held for a longer time than the end time threshold, the hold requesting unit 633 requests termination of the automated driving mode. More specifically, the hold requesting unit 633 sends a command to display a termination request image through the input/output interface 61 to the meter cluster 4 connected to the in-vehicle network 7; the termination request image indicates a request to terminate the automated driving mode and is stored in the memory 62.

The attitude changing unit 634 determines whether or not the hold detecting unit 632 continues detecting hold of the steering wheel for a longer time than the hold time threshold stored in the memory 62. If it is determined that detection of hold of the steering wheel continues for a longer time than the hold time threshold, the attitude changing unit 634 moves the driver seat or the steering wheel so as to have an attitude prior to detection of the attitude changing movement. More specifically, the attitude changing unit 634 sends an attitude changing signal through the input/output interface 61 to the seat controller 1 or the steering controller 2 connected to the in-vehicle network 7; the attitude changing signal is a command to change the attitude to the previous attitude stored in the memory 62, i.e., the attitude prior to detection of the attitude changing movement.

Figure 6:
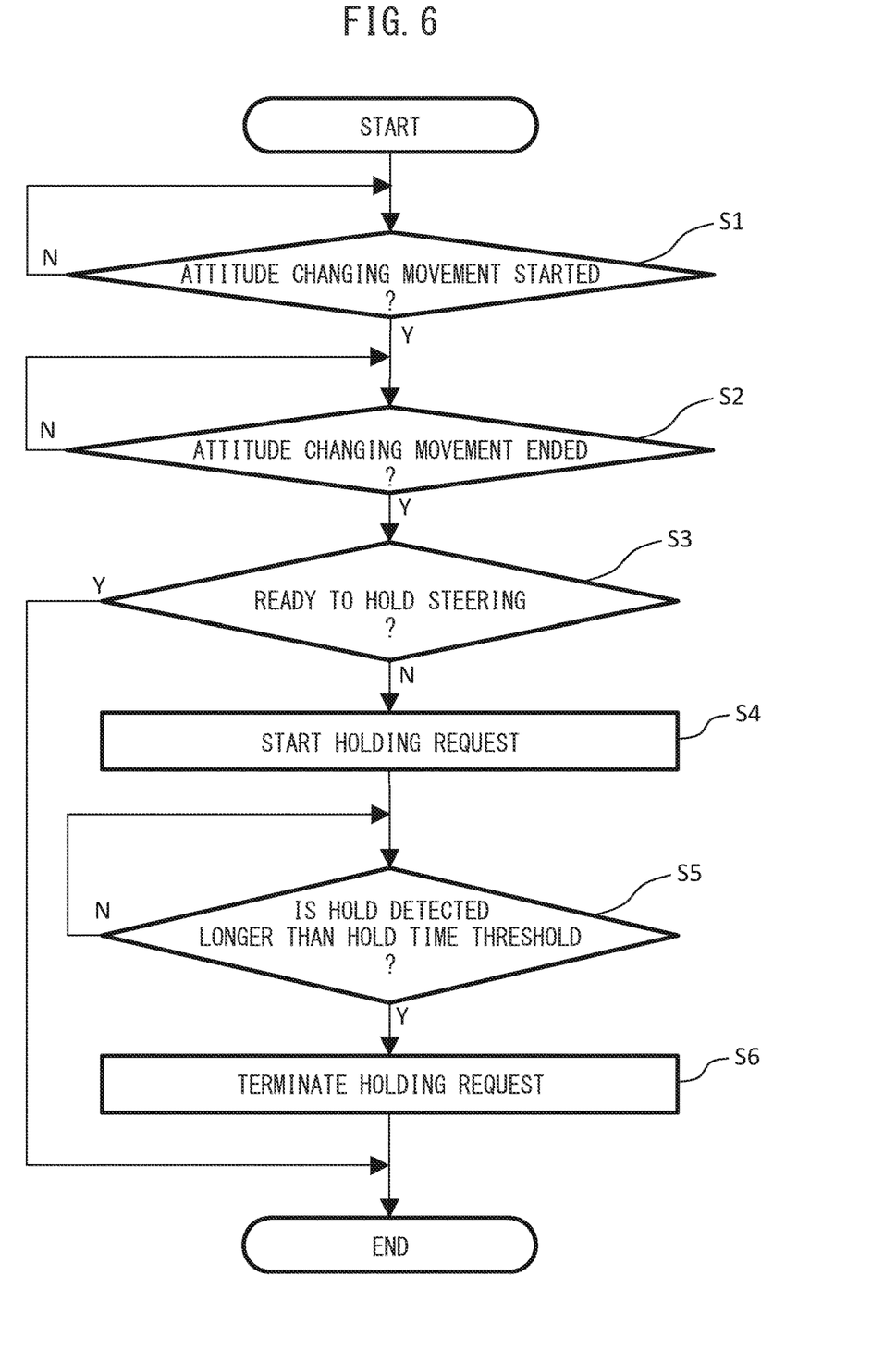
FIG. 6 is a flowchart of the driving assistance processing.

FIG. 6 is a flowchart of the driving assistance processing. The processor 63 repeatedly executes the driving assistance processing while the vehicle V travels in the automated driving mode.

The movement detecting unit 631 determines whether or not an attitude changing movement of the driver seat or the steering wheel of the vehicle V has started (step S1). If it is not determined that an attitude changing movement has started (No in step S1), the movement detecting unit 631 repeats the processing of step S1.

If it is determined that an attitude changing movement has started (Yes in step S1), the movement detecting unit 631 determines whether or not the attitude changing movement is ended (step S2). If it is not determined that the attitude changing movement is ended (No in step S2), the movement detecting unit 631 repeats the processing of step S2.

If it is determined that the attitude changing movement is ended (Yes in step S2), the hold requesting unit 633 determines whether or not the driver is in a posture ready to hold the steering wheel (step S3). If it is determined that the driver is in a posture ready to hold the steering wheel (Yes in step S3), the processor 63 terminates the driving assistance processing.

If it is not determined that the driver is in a posture ready to hold the steering wheel (No in step S3), the hold requesting unit 633 starts requesting the driver to hold the steering wheel (step S4).

Next, the hold requesting unit 633 determines whether or not the hold detecting unit 632 continues detecting hold of the steering wheel for a longer time than the hold time threshold (step S5).

If it is determined that the hold detecting unit 632 does not continue detecting hold of the steering wheel for a longer time than the hold time threshold (No in step S5), the hold requesting unit 633 repeats the processing of step S5. On the other hand, if it is determined that the hold detecting unit 632 continues detecting hold of the steering wheel for a longer time than the hold time threshold (Yes in step S5), the hold requesting unit 633 terminates the holding request (step S6); then, the driving assistance processing terminates.

Executing the driving assistance processing as described above, the ECU 6 can appropriately make a request to hold the steering wheel according to the circumstances of the driver.

Note that those skilled in the art can apply various changes, substitutions and modifications without departing from the spirit and scope of the present invention.

What is claimed is:

1. A driving assistance device comprising a processor configured to:
    detect an attitude changing movement for changing the attitude of a driver seat or a steering wheel of a vehicle capable of traveling in an automated driving mode in which a driver need not perform driving operations during traveling,
    detect whether or not the steering wheel is held by the driver, and
    start a holding request asking the driver to hold the steering wheel if the movement detecting unit has detected the attitude changing movement in the automated driving mode and if holding on the steering wheel has not been detected.

2. The driving assistance device according to claim 1, wherein the processor is further configured to detect the attitude changing movement if the amount of movement of the driver seat or the amount of movement of the steering wheel is greater than a movement amount threshold.

3. The driving assistance device according to claim 1, wherein the processor is further configured to start the holding request if the end of the attitude changing movement has been detected.

4. The driving assistance device according to claim 1, wherein the processor is further configured to stop starting the holding request if it is determined that the driver is in a posture ready to hold the steering wheel, based on an image of the driver captured by a driver monitoring camera.

5. The driving assistance device according to claim 4, wherein the processor is further configured to detect the end of the attitude changing movement if no attitude changing movement occurs for a longer time than a moving time threshold after the start of the attitude changing movement is detected.

6. The driving assistance device according to claim 1, wherein the processor is further configured to terminate the holding request if holding on the steering wheel has been detected for a longer time than a hold time threshold after the holding request is started.

7. The driving assistance device according to claim 6, wherein the processor is further configured to request termination of the automated driving mode if absence of holding on the steering wheel has been detected for a longer time than an end time threshold after the holding request is started, the end time threshold being greater than the hold time threshold.

8. The driving assistance device according to claim 6, wherein the processor further configured to move the driver seat or the steering wheel so as to have an attitude prior to detection of the attitude changing movement if detection of hold of the steering wheel continues for a longer time than the hold time threshold.

9. A method of driving assistance, comprising
starting requesting a driver to hold a steering wheel of a vehicle if an attitude changing movement for changing the attitude of a driver seat or the steering wheel of the vehicle is detected, the vehicle traveling in an automated driving mode in which the driver need not perform driving operations.

\* \* \* \* \*